UNITED STATES PATENT OFFICE.

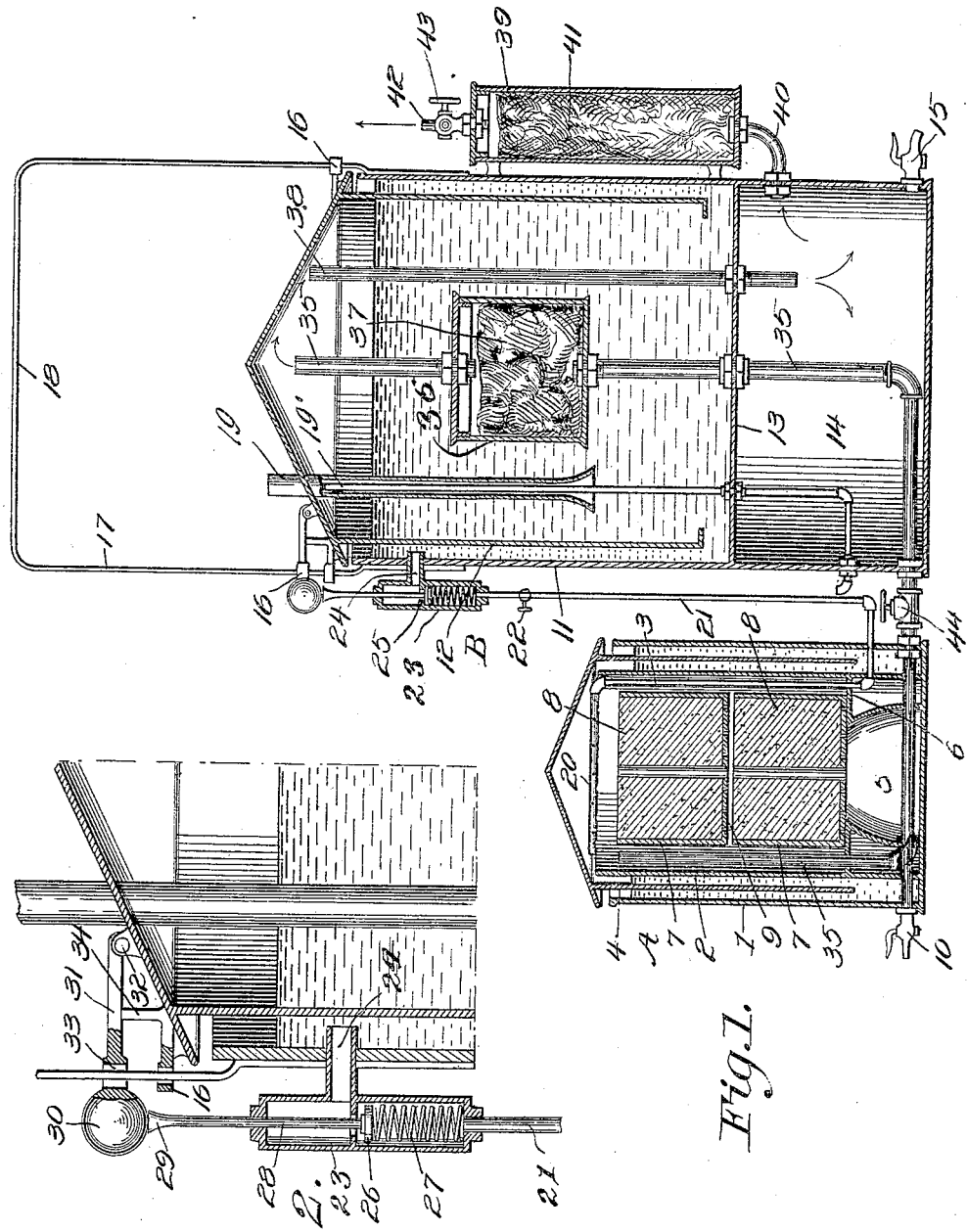

OSCAR R. MOBERLEY, OF MATAGORDA, TEXAS.

ACETYLENE-GAS GENERATOR.

956,497.
Specification of Letters Patent.
Patented Apr. 26, 1910.

Application filed September 8, 1909. Serial No. 516,665.

*To all whom it may concern:*

Be it known that I, OSCAR R. MOBERLEY, a citizen of the United States, residing at Matagorda, in the county of Matagorda and State of Texas, have invented new and useful Improvements in Acetylene-Gas Generators, of which the following is a specification.

This invention relates to acetylene gas generators, the object of the invention being to provide a simple, inexpensive and compact construction of generator which is safe and certain in operation and whereby the generated gas will be purified and dried prior to its passage to the burners, with resulting economy and the production of a better light.

A further object of the invention is to provide simple and effective means for controlling the gas generation in proportion to the amount consumed, for automatically arresting the generation of gas upon the storage of a determined volume of gas within the gasometer, and for automatically starting the generation of gas when the volume of gas in the gasometer falls below a predetermined quantity.

With these and other objects in view, the invention consists of the features of construction, combination and arrangement of parts hereinafter fully described and claimed, reference being had to the accompanying drawings, in which:—

Figure 1 is a vertical central section through a gas generator embodying my invention. Fig. 2 is fragmentary vertical section on an enlarged scale through the top of the gasometer, showing the construction of the water feed valve and its controlling means.

Referring to the drawing, A designates a generator of that type in which water is fed to the carbid, and the gasometer. The generator comprises a tank 1 having an internal concentric shell or chamber 2 forming a carbid compartment 3. Said compartment is closed against communication with the space between the wall of the tank and the shell, which space forms a water containing well, as shown. Vertically movable in the well and sealed against the escape of gas by the water therein is a bell 4.

The carbid compartment is open at the top for communication with the bell and for the insertion of the carbid and removal of the waste. Removably mounted in the base of the compartment is a hollow stand 5 preferably tapering in form and provided at its upper end with an annular flange 6 to support one or more carbid baskets or receptacles 7, two of which are shown and arranged in superposed relation. Each receptacle is adapted to contain the carbid 8 in lump or other suitable form and is provided with a perforated bottom 9 for the discharge of the water, which finally finds its way into the stand 5, which serves as a waste water receptacle. A drain valve 10 is provided for drawing off the water from the base of the carbid compartment.

The gasometer comprises a water containing tank 11 in which is mounted a movable bell 12. This tank is provided with a horizontal partition 13 supporting the water containing space thereof from a bottom gas storage or receiving chamber 14 provided with a drain valve 15 for the withdrawal of the deposited water and impurities therefrom. The bell is provided with sleeves 16 movable on the vertical guide arms 17 of a bail shaped guide frame rising from the tank, the upper cross bar 18 of which frame forms a stop to limit the upward movement of the bell. Extending through the top of the bell and above and below the same is a safety or vent pipe 19, the lower end of which is normally submerged in and sealed by the water in the tank. When the quantity of the gas in the bell, however, reaches the danger point and the bell is forced up to its limit, the lower end of said pipe is moved above the body of water, allowing the excess gas to vent therethrough. The upper end of the pipe 19 may be connected to a conductor leading to the exterior of the building to discharge the gas to the atmosphere.

Arranged within the upper portion of the carbid compartment 3 of the generator is a spray pipe 20 whereby a stream of water may be directed upon the carbid to effect the generation of gas. This spray pipe communicates with a water supply pipe 21 extending up alongside the tank 11 and containing a cut off valve 22. Connected with the upper end of said pipe 21 is a valve casing 23 having a lateral inlet 24 leading into said tank 11, which inlet communicates with said casing above an intermediate ported valve seat 25. By this arrangement water flows by gravity, when the pipe 21 is open, from the gasometer tank to the spray pipe 20, as will be readily understood.

The discharge of water from the tank 11 to the pipe 21 is controlled by a vertically movable valve 26 adapted to be closed against the under side of the seat 25 by a spring 27 arranged within the lower portion of the casing 23. The valve is carried by a stem 28 extending upwardly through the valve casing to a point above the top of the tank 11 and provided with a contact portion 29. This contact portion 29 is adapted to be engaged by a weight 30 upon one end of an arm 31 pivoted to the top of the gasometer below, as at 32, to swing in a vertical plane. Said arm is formed with an opening 33 for the passage of the adjacent guide rod 17, by which its swinging motion is limited and its lateral deflection prevented. The arm is supported in a horizontal position by a short standard 34 rising from the bell.

The gas supply pipe 35 communicates at one end with the top of the carbid compartment 3 and extends horizontally through the base of said compartment and through the wall of the tank 1 and wall of the tank 11 into the chamber 14 of the gasometer and thence extends upwardly through the partition 13 and said tank 11 to a point above the level of the water in the tank, to convey the generated gas from the generator to the bell of the gasometer. In the vertical portion of this pipe extending through the water in the tank 11 is a chamber 36 containing a body of sponge or other absorbent material 37 through which the gas flows on its passage, and whereby the moisture and fine particles are absorbed from the gas, thus preliminarily purifying it. The gas contained within the bell of the gasometer is conducted therefrom down into the chamber 14 through a conducting pipe 38, in which chamber the gas is stored for discharge to the burners. Arranged on the exterior of the tank 11 is a chamber or casing 39 communicating at its lower end with the chamber 14 through a conductor 40 and containing a body of cotton or other absorbent material 41 through which the gas flows on its passage to the service pipe, and whereby the remaining particles of moisture and foreign substances are extracted from the gas, thus effecting a secondary and final purification. Hence the gas supplied to the burners will be dry and pure, with resulting economy in consumption and the production of a better light. The gas passes from the chamber 39 through an outlet 42 having a controlling valve 43, and which is connected in practice with the house service pipe. A valve 44 is arranged in the portion of the gas supply pipe 35 between the generator and gasometer by which communication between the two may be cut off in replenishing the generator with carbid or in cleansing the same or in making repairs.

The gas generated in the generating apparatus A flows in the manner described into the bell of the gasometer, which rises and falls proportionately to the amount of gas therein. When the pressure is at or above normal service pressure and the bell is sustained above its lowest position, the weight 30 of the pivoted valve controlling arm 31 is out of contact with the valve stem 28, so that the valve 26 will be held seated by the spring 27 to cut off the flow of water from the gasometer tank to the sprayer 20. When, however, the gas is used up and the bell of the gasometer descends nearly to its full extent, the weight 30 engages and depresses the stem 28 thus forcing the valve 26 open, allowing the water to flow from the gasometer to the sprayer 20 to again start the generation of gas, and said valve will be held open as the bell continues to descend until fresh gas fills the bell and the bell rises to a sufficient extent to elevate the weight 30 out of contact with the valve stem, whereupon the valve will be closed by the spring 27 to cut off the flow of water. In this manner the feed of water to the carbid and the generation of gas will be automatically and sensitively controlled to regulate the generation proportionately to the amount of gas consumed, thus securing efficiency and safety in the use of the apparatus.

I claim:—

An acetylene gas producer comprising a generator having a carbid containing space, a gasometer, a gas conducting pipe leading from the generator into the bell of the gasometer, a water feed device in the generator, a water supply pipe leading thereto from the water containing space of the gasometer, a valve casing in said water supply pipe, a spring closed valve in said casing having an outwardly projecting stem, a weighted arm pivotally mounted on the gasometer bell to engage said stem and open said valve upon the descent of the bell, said arm having an opening, guide rods extending upwardly from the gasometer tank, guide sleeves on the gasometer bell engaging said rods, one of the guide rods being of less diameter than and extending through the opening in the weighted arm, and a stop integral with one of said sleeves and arranged beneath the weighted arm to limit the downward movement thereof.

In testimony whereof I affix my signature in presence of two witnesses.

OSCAR R. MOBERLEY.

Witnesses:
F. L. Rugsley,
E. C. Baker.